June 13, 1950 G. H. BULLARD 2,511,563
CUTOFF MACHINE

Filed May 17, 1946 3 Sheets-Sheet 1

Inventor
George H. Bullard
By Ernest R. Llewellyn
Attorney.

June 13, 1950 G. H. BULLARD 2,511,563
CUTOFF MACHINE
Filed May 17, 1946 3 Sheets-Sheet 2

Inventor
George H. Bullard
By Ernest R. Llewellyn.
Attorney.

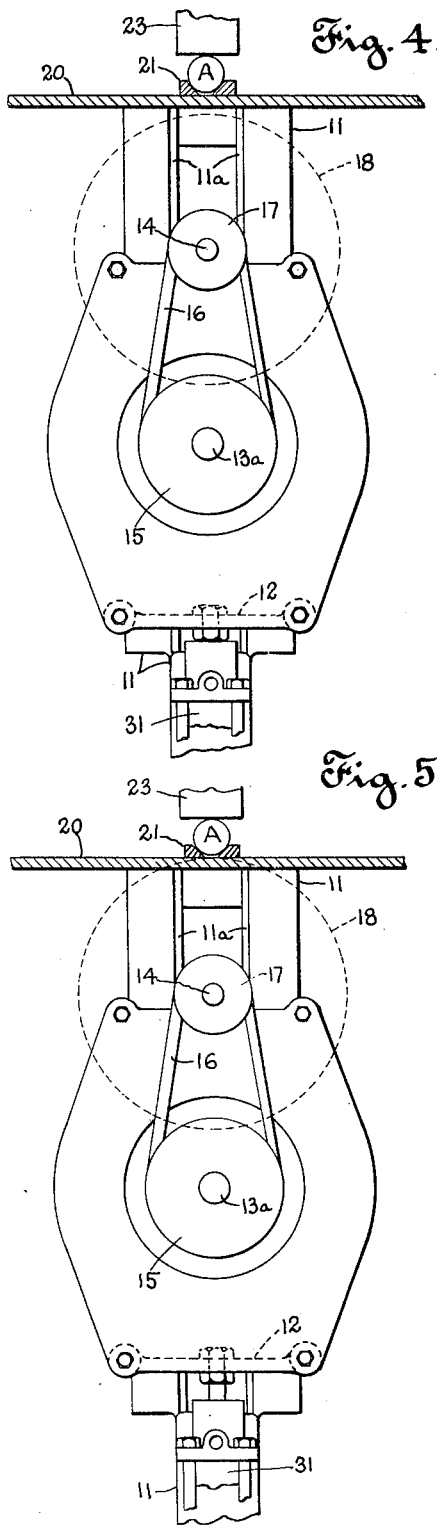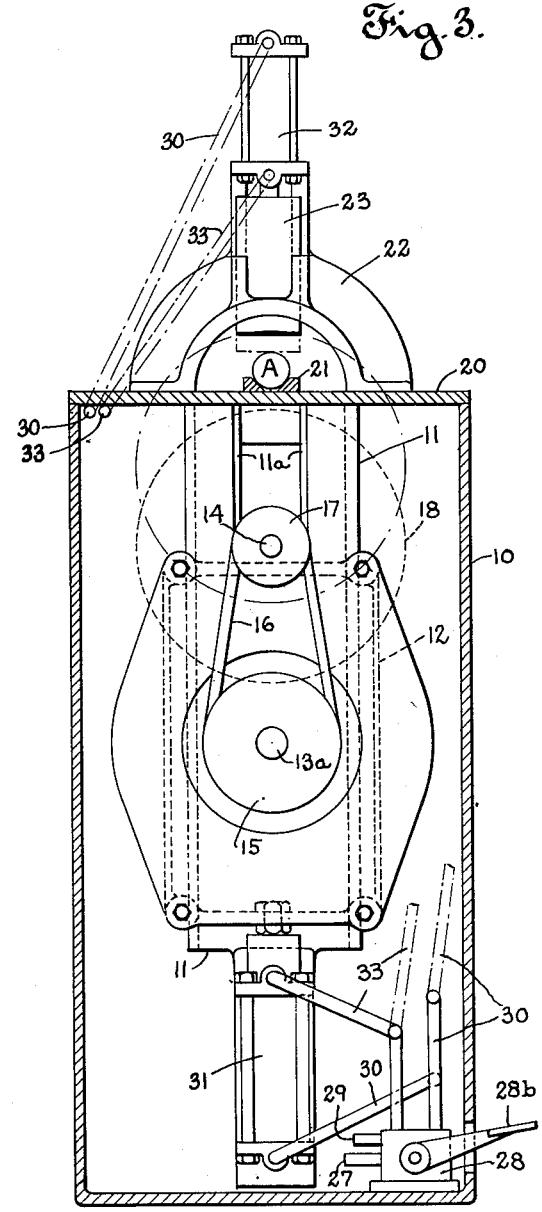

Patented June 13, 1950

2,511,563

UNITED STATES PATENT OFFICE 2,511,563

CUTOFF MACHINE

George H. Bullard, Westboro, Mass.

Application May 17, 1946, Serial No. 670,650

6 Claims. (Cl. 51—98)

This invention relates to machine tools and more particularly to a stock cutting machine such as is generally utilized for severing material into desired sections.

The use of abrasive wheels for severing materials is well known in the art. Such abrasive cutting wheels are of a thin cross-section and are rotated at a high speed.

Materials to be cut or severed vary to a great degree both in their structure and hardness and also in their cross-sectional area. These variations pose a problem in a safe rate of the feed of the cutting element through the material in view of the structure of the cutting element. A soft material will offer less resistance to the cutting element than a hard material and likewise, the area through which the cut is to be made has a direct bearing on a proper and safe cutting feed. Another factor that is considered is the character and cutting action of the cutting element itself.

In machines of the herein referred to character manual adjustments have been employed to regulate the cutting feed of the abrasive or like cutting wheel relative to the size and material to be operated upon so as to obtain a maximum efficiency and at the same time not force the cutting wheel beyond its safety factor where the wheel would rupture. It is obvious that where the human element enters into the making of necessary adjustments and a knowledge of all materials that may be operated upon, errors and mistake of judgment are likely to be present and would result in serious damage to person and property.

Accordingly one of the primary objects of the present invention is to provide a machine adapted to cutting materials wherein the rate of cutting feed will automatically adjust itself in a direct relation to the character of the material to be operated upon.

Another object of the invention is to provide a single constant pressure source of power and a pressure system for machines having two operating elements that will be operated in sequence and wherein each of the elements function at a different speed relative to one another.

Still another object of the invention is to provide a machine of the present character wherein the sources of power and cutting element of the machine are contained in a base with a removable table top and wherein only a portion of cutting element will project from the base during a severing operation.

A further object of the invention is to provide a machine of the herein character with a combined stock clamp and cutting element guard arranged to enclose the cutting element as it is projected from the machine base.

The foregoing objects are intended as a general explanation and are not to be construed as limiting the invention thereto as other objects and advantages will become apparent from the following description and accompanying drawing illustrating a preferred form of the invention sufficient to enable those skilled in the art to understand the construction and operation thereof.

Referring to the drawings:

Fig. 3 is a sectional view taken substantially along line 3—3, Fig. 1.

Fig. 4 is a fragmentary view corresponding substantially to Fig. 3 but shows some of the parts in a different position, and Fig. 5 corresponds substantially to Fig. 4 but shows some of the parts in another position.

The machine elements

Figure 1:
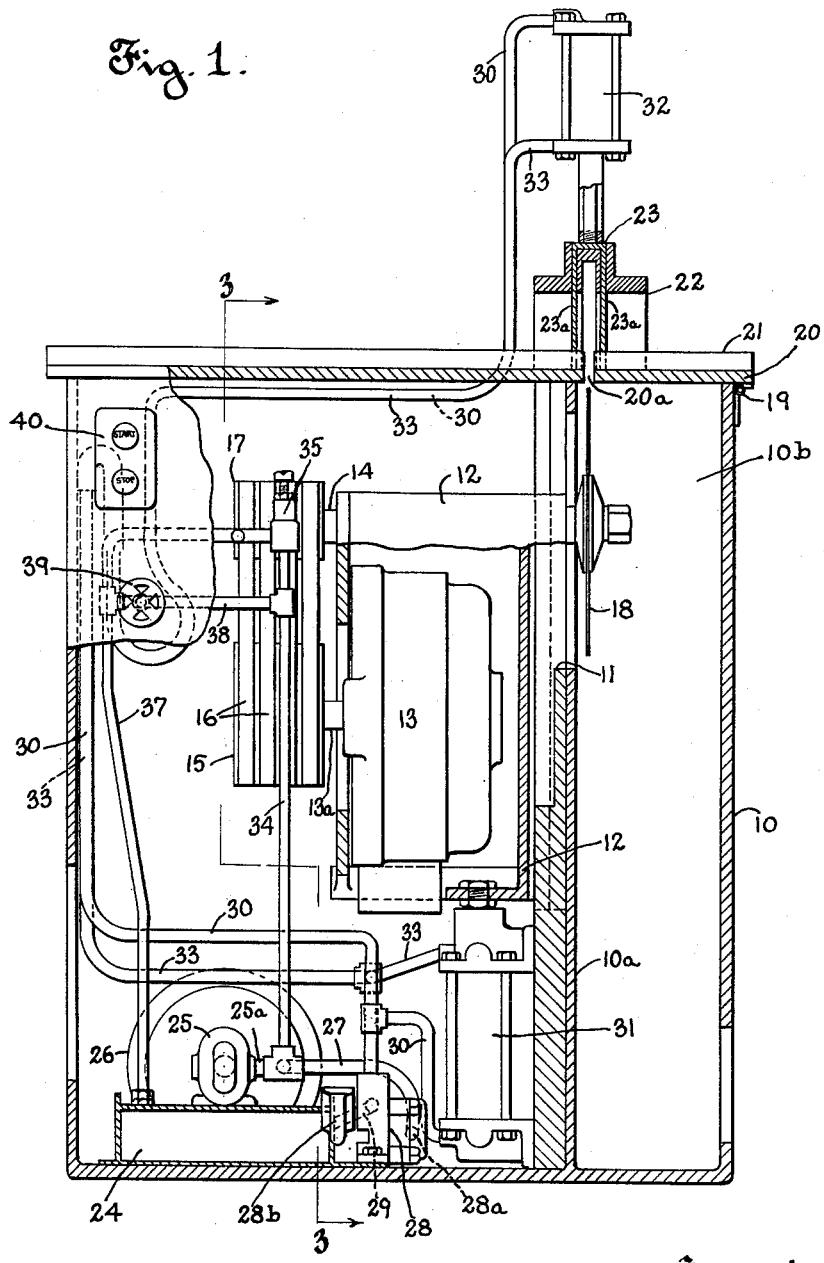
Fig. 1 is a sectional elevation of the machine with the cutting element in its inoperative position.
Figure 2:
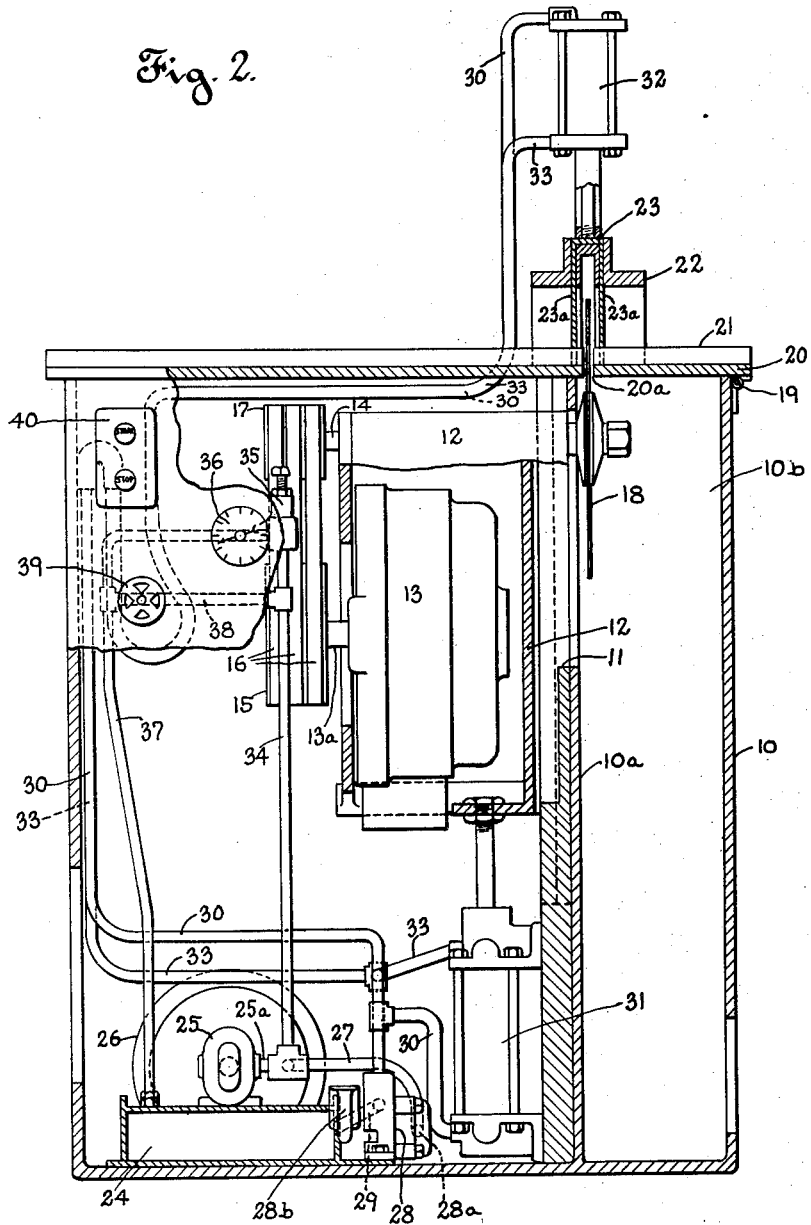
Fig. 2 is a view corresponding substantially to Fig. 1 but shows the cutting element in a different position.

In the present structure the base 10 is provided with a partition 10a to which a frame 11 is secured. This frame 11 is provided with guide ways 11a adapted to receive a coacting guide portion of a carriage 12 that supports a motor 13 and a rotatable spindle 14. The motor shaft 13a has a pulley 15 secured thereto that, in this instance, is arranged to engage with a plurality of endless belts 16 that in turn engage with and drive a pulley 17 secured to the spindle 14. A cutting wheel or element 18 is secured to the opposed end of the spindle 14 that is disposed in a chamber 10b in the base. Hinged to the base 10, at 19 is a table top 20 having a stock guide 21 secured thereto. An aperture 20a is provided in the table top 20 and extends through the stock guide 21 so as to permit the cutting element 18 to pass through stock disposed in the guide 21. Positioned above the aperture 20 is a housing 22 that is substantially arc-shaped and secured to the table 20. This housing 22 is adapted to function as a guide for a clamp slide 23 having opposed side walls 23a that combine with the housing 22 to form a guard for the cutting element 18 when the clamp 23 is in operative position and the cutting element 18 has passed through and severed the stock A disposed in the table top guide 21.

The guide ways 11a are close to and parallel with the vertical plane of the wheel, so that the wheel is guided accurately for precision cutting and prevented from angular movement relative to the cut, and thus minimizing wheel breakage.

The pressure system and drive

In the present arrangement fluid pressure is utilized to actuate the reciprocating units of the machine. A fluid supply reservoir 24 is disposed in the base 10 and is connected to a pressure pump 25 of any well known construction driven by a motor 26. A conduit 27 connects the pump 25 to a foot operated valve 28 also of the well known construction and having a series of ports for directing the pressure through conduits with a return conduit 29 disposed between the valve 28 and the reservoir 24. One conduit 30 connects the valve 28 with the bottom end of the carriage actuating cylinder and piston 31 and the top end of the clamp actuating cylinder and piston 32. A second conduit 33 connects the valve 28 with the top end of the carriage cylinder 31 and the bottom clamp of the cylinder 32 to form a complete circuit together with the conduit 30.

Disposed between the pressure outlet 25a of the pump and the inlet port 28a of the control valve 28 is a conduit 34 forming part of a pressure regulating circuit having an adjustable set pressure regulating valve 35 and a visible pressure guage 36 with a continuing conduit 37 disposed between the regulating set pressure valve 35 and the fluid supply tank 24. This pressure regulating circuit is provided with a by-pass conduit 38 having one end connecting with the conduit 34 and disposed between the valve 35 and the pressure outlet 25a of the pump. The opposed end of this by-pass conduit 38 connects with the return conduit 37 and is provided with a regulating valve 39.

Operation of the Machine

The electrically driven motors 13, 26 are started and stopped by push buttons 40 and a suitable circuit as is well known. These motors may be optionally started either before or after a length of stock A has been positioned in the guide 21 which is presently illustrated as of a substantially V-shape.

When the pump motor 26 is in operation and the pressure actuated elements of the machine are at rest pressure is developed by the pump and this pressure is carried by the conduit circuit 33 to the top of the carriage cylinder 31 and the bottom of the clamp cylinder 32 thus retaining the clamp 23 and carriage 12 in their inoperative positions. Continued pressure from the pump 25 when the clamp 23 and carriage are in their inoperative positions is by-passed thru the conduits 34, 37, and their related circuit elements, to the supply tank 24.

After the stock A has been properly positioned, the valve pedal 28b is depressed to cause the pump pressure to be transferred through suitable ports in the valve 28 and through the conduit circuit 30 and directed to the bottom end of the carriage cylinder 31 and top of the clamp cylinder 32.

It is to be noted that equal pressure is directed to the clamp cylinder 32 to cause the clamp 23 to engage with the stock, Figs. 3 and 4, and is directed to the bottom of the carriage cylinder 31 to lift the carriage and its associated members. This equal pressure causes the clamp 23 to rapidly move down into operative position while the weight of the carriage 12 and associated elements retards its movement upwardly by the pressure so that the clamp 23 engages with the stock A in advance of engagement of the stock by the rotating cutting element see Figs. 3 and 5.

Continued pressure through the conduit circuit 30 causes the rotating cutting wheel or element 18 to be engaged with and passed through the stock A with the wheel 18 engaging in the guard 22 and between the side walls 23a of the clamp 23.

When the cutting wheel 18 engages with the stock A its rate of feed through the stock is retarded in a direct relation to to the resistance caused by the character of the stock. Stock that is soft in character will permit the constant pressure to feed the cutting wheel 18 through the stock at a maximum rate of feed while hard or tough stock will retard the rate of feed. Should a cutting wheel or element of the usual character be forced with equal rate of feed for the various characters of stock the cutting element it is liable to fracture. In the present machine, as the cutting element 18 meets greater resistance, the pressure is diverted to the relief circuit conduit 34 and the pressure is adjusted by means of the pressure valve 35 in this circuit. The by-pass line valve 39 may be adjusted to further control the permissible build-up of pressure in the circuits.

After the cutting element 18 has passed through the stock A the valve pedal 28b is released thus again directing the pressure through the conduit circuit 33 that returns the clamp 23 and carriage 12 to their at rest positions. As the pressure is transferred to this conduit 33 the added weight of the carriage 12 and its associated elements that retarded their movement in a functionally operative direction will now cause the carriage to be moved in an opposed direction at a greater rate of speed and thus the cutting element will be completely withdrawn from the path of the stock before the clamp 23 is raised from its engaging position. Since the pipe line 30 directly and continuously connects the lower piston chamber of the motor 31 and the upper piston chamber of the clamp motor 32, the weight of the carriage 12 forces some outflowing fluid back through pipe 30 to hold the work clamped until the wheel is below the work. Pipe 33 connects the other chambers. This sequence of operation prevents movement of the stock while the cutting element is disposed out of its protective position in the base of the machine.

While the form and arrangement of parts as shown in the drawings and as above described are preferred, the invention is not to be limited to such form and arrangement except so far as the claims may be so limited, it being understood that changes might well be made in the form and arrangement of the parts by those skilled in the art without departing from the spirit and scope of the invention and in which it is the intention to claim all novelty inherent in the invention as broadly as possible in view of the prior art.

What I claim is:

1. A machine of the character specified having a table with a stock guide and support together with a pressure actuated clamp disposed in a cutting element guard, said clamp comprising spaced apart walls forming a substantially enclosed chamber coincident with said guard when said clamp is in its operative position and wherein said cutting element engages in said chamber after passing through the stock.

2. In a stock cut-off machine, a base, a table hinged to said base and having an aperture therein, a stock guide on said table, a combined guard and support associated with said guide and aperture with a slidable clamp member disposed in said guard together with a pressure operated cylinder and piston fixed to said support and disposed to actuate the suitable member in opposed directions, a carriage slidably disposed in said base and supporting a member adapted to be rotated that has a cutting element associated therewith positioned for engagement in said aperture, a second pressure operated cylinder and piston disposed to actuate said carriage with means to reciprocate said first and second pistons relative to one another, said means including a pressure element supply and a pressure pump with a source of power adapted to operate said pump, a manually operable valve disposed between said pressure pump and said cylinders and normally directing pressure to urge said clamp member and cutting element to their inoperative positions together with conduit connections between said valve and the opposed ends of each of said cylinders together with a pressure regulating conduit circuit disposed between said pressure pump and said valve with a return conduit in said circuit connecting with said pressure element supply.

3. A stock cut-off machine embodying a stock support and a clamp having opposed positions that is adapted to secure material in a position to be operated upon and a reciprocable carriage that is provided with a unit adapted to rotate a cutting element together with means for actuating said clamp and carriage in their opposed directions in sequence, said means including a single source of pressure supply to a pressure actuated piston associated with said clamp and a pressure actuated piston associated with said carriage with a manually operable control valve disposed between said clamp and carriage and the pressure supply means with means for varying the pressure from said pressure supply, said last means including an independent conduit circuit disposed between the inlet of said pressure supply means and a source of supply for said pressure means and provided with an adjustable pressure regulating valve and gauge disposed in said circuit, a by-pass conduit disposed in advance of the pressure regulating valve and connecting with the source of supply and a regulating valve disposed in said by-pass conduit.

4. A cut-off machine comprising a base having a work support thereon provided with a wheel slot, a thin cut-off wheel located wholly below the support and movable vertically into the slot to cut a work piece only from beneath, a vertically movable carriage having bearings which movably support the wheel on a horizontal axis, means for rotating the wheel at any position thereof, cooperating vertical guide ways on the base and carriage located close to and parallel with a side plane of the wheel which insure that the carriage moves the wheel vertically to cut the work, a fluid pressure motor mounted on the base and having a piston which movably supports the carriage, a work clamp movable to secure the work on the support, a fluid pressure motor having a piston connected to move the clamp towards and from the work, and fluid pressure mechanism including a fluid reservoir, a pump, a manually operated control valve and conduits for supplying fluid under equal pressures from the pump to both sides of each piston to removably clamp the work on the support and to move the wheel to and from a work cutting position.

5. A cut-off machine according to claim 4 in which there is a common pipe line connecting the piston chamber above the piston of the clamp actuating motor with the piston chamber beneath the piston of the carriage motor which serves to supply fluid under pressure simultaneously to move the clamp downwardly and to raise the carriage, and in which a common pipe line connects the remaining piston chambers of the motors, so that the relation of gravity to the carriage movement insures that the work is clamped initially before the wheel touches it and the work is held clamped until after the wheel has left the cut.

6. A cut-off machine according to claim 4 comprising a wheel guard having a top member extending from the work support at each end of and over the entire slot, and wherein the clamp is a bifurcated member having spaced plates engaging the work close to and on opposite sides of the wheel slot which form sides of the wheel guard and cooperate with the top member to substantially enclose the wheel above the work support.

GEORGE H. BULLARD.

REFERENCES CITED

The following references are of record in the file of this patent:

UNITED STATES PATENTS

| Number | Name | Date |
|---|---|---|
| 2,354,509 | Dreher | July 25, 1944 |
| 2,360,070 | Meyerbach | Oct. 10, 1944 |
| 2,361,961 | Pruitt | Nov. 7, 1944 |

FOREIGN PATENTS

| Number | Country | Date |
|---|---|---|
| 452,317 | Great Britain | Mar. 6, 1936 |
| 567,899 | Great Britain | Mar. 7, 1945 |
| 735,621 | France | Nov. 12, 1932 |

Certificate of Correction

Patent No. 2,511,563 June 13, 1950

GEORGE H. BULLARD

It is hereby certified that error appears in the printed specification of the above numbered patent requiring correction as follows:

Column 5, line 10, for the word "suitable" read *slidable*;

and that the said Letters Patent should be read with this correction therein that the same may conform to the record of the case in the Patent Office.

Signed and sealed this 5th day of September, A. D. 1950.

[SEAL]

THOMAS F. MURPHY,
*Assistant Commissioner of Patents.*